(12) United States Patent
Hillsman

(10) Patent No.: US 6,626,843 B2
(45) Date of Patent: Sep. 30, 2003

(54) RESPIRATORY TIMING AND LUNG DEFLATION METHOD AND DEVICE

(76) Inventor: Deane Hillsman, 870 El Chorro Way, Sacramento, CA (US) 95864-5244

( * ) Notice: Subject to any disclaimer, the term of this patent is extended or adjusted under 35 U.S.C. 154(b) by 0 days.

(21) Appl. No.: 09/965,988

(22) Filed: Sep. 28, 2001

(65) Prior Publication Data

US 2003/0065272 A1 Apr. 3, 2003

(51) Int. Cl.[7] .............................................. A61B 5/08
(52) U.S. Cl. ..................................................... 600/529
(58) Field of Search ............................... 600/529, 531, 600/532, 533, 534, 535, 536, 537, 538, 539, 540, 541, 542, 543

(56) References Cited

U.S. PATENT DOCUMENTS

| | | | | | |
|---|---|---|---|---|---|
| 3,991,304 | A | * | 11/1976 | Hillsman | .................... 600/538 |
| 4,798,538 | A | * | 1/1989 | Yagi | ............................ 434/262 |
| 4,981,295 | A | * | 1/1991 | Belman et al. | ............... 482/13 |
| 4,984,158 | A | * | 1/1991 | Hillsman | ............... 128/200.14 |

FOREIGN PATENT DOCUMENTS

JP        10043328 A   *   2/1998

* cited by examiner

Primary Examiner—Max F. Hindenburg
Assistant Examiner—Navin Natnithithadha

(57) ABSTRACT

A portable respiratory prompting device using simple visual and/or auditory means to indicate the onset of inspiration and expiration to prompt a subject into more desirable breathing patterns. Inspiration and expiration are indicated by LED's and simple high and low pitched "beep" sounds. The device is particularly suited for activating previously learned breathing patterns from visual biofeedback training. Optionally patients with Emphysema or Asthma may activate an button producing a prolonged expiratory phase to further lung deflation. It is also suited to prompt patients with Hyperventilation Syndrome attacks to slower breathing, and breathing control of subjects in stressful environments such as aircraft pilots or underwater divers, wherein an optional waterproof model is available. It may control breathing in a variety of applications such as pregnant subjects doing Lamaze breathing exercises and athletes in training. It may also be incorporated into clock mechanisms for day and night prompting.

9 Claims, 5 Drawing Sheets

RESPIRATORY TIMING AND LUNG DEFLATION METHOD AND DEVICE

BACKGROUND OF THE INVENTION

This invention relates to improved methods and apparatus to prompt patients with lung disease, and other subjects, into more physiologically appropriate breathing patterns by simple visual and auditory biofeedback means. Hilisman incorporates by reference his U.S. Pat. No. 3,991,304 which describes a sophisticated and complex visual biofeedback device suitable only for medical professional use. This present invention extends that concept into a simple portable device suitable for use under field operational conditions, with both visual and auditory biofeedback means suitable for individual subject use in a lower technical environment.

A wide variety of timing metronomes of both mechanical and electrical design have been well known in the music industry for many years. Almost all have been simple devices designed to give an auditory signal of equal periodicity and permitting only an overall rate adjustment. More modern electronic music metronome devices permit a wide spectrum of timing signals suitable for music timing and rhythm coordination needs, and some with visual prompting. This present invention relates to a timing device unique for medical needs wherein the overall rate and the relative timing of inspiration and expiration are adjustable, in essence therefore an "asynchronous metronome" specific to medical respiratory needs.

In the course of using Hillsman's advanced visual biofeedback training device, U.S. Pat. No. 3,991,304 it was discovered that native breathing patterns in diseased emphysema patients could be altered and that these altered breathing patterns were retained in part (Reference: A Biofeedback Method To Alter Breathing Patterns In COPD; Hilisman, D. and Lillington, G. A.; Third International Conference on Pulmonary Rehabilitation and Mechanical Ventilation; Mar. 12, 1991—Reference: A Visual Biofeedback Method To Define And Teach Breathing Patterns, and, Clinical Experience With A Visual Biofeedback Method In COPD Rehabilitation; Hillsman, D.; International Society for the Advancement of Respiratory Psychophysiology; Second Annual Meeting, Oct. 9, 1995, Biological Psychology, Vol. 43, Issue 3, Jun. 28, 1996, pages 261 and 243–244. In some unknown manner it is apparent these learned breathing patterns are being imprinted in the patient's subconscious, and recalled and used with a variable degree of accuracy. Though it is usually easy to get patients to follow breathing pattern analogs using the sophisticated visual device, the problem of proper breathing patterns in the home environment remained. Furthermore, many patients would revert to their previous inefficient native breathing patterns under conditions of stress or with the passage of time. It was discovered with the patient blinded, a simple auditory signal to breathe in and out at the appropriate points in the breathing cycle was highly effective in prompting patients into an accurate reproduction of the breathing waveform analog. Thus the concept of the instant invention was created, to activate these learned breathing patterns in a more reliable and accurate manner by means of an auditory "beep" (high pitched) and the beginning of inspiration and another "beep" (low pitched) at the beginning of expiration. Further, it was considered desirable to use the familiar and soothing "tick/tock" sound of a grandfather clock as the auditory prompt as the preferred embodiment, though the concept could also be implemented with a variety of brief or continuous individual sounds or musical sounds or breath sounds of inspiration and expiration.

The physiologic theory underlying Emphysema and Asthma breathing patterns is discussed in U.S. Pat. No. 3,991,304 and in the references. Briefly, when suffering dyspnea it is natural for a patient to try and breathe faster, to inspire in a dominant manner, to breathe forcefully, and generally to shorten the time of expiration. Pulmonary mechanical reasons require such patients to breathe slower, to breathe gently, and to breathe dominantly focused on expiration and to prolong the time of expiration. If the patient does not breathe in this manner they exhibit the problem of so-called "Air Trapping" as it is inherently more difficult to exhale than to inhale, and particularly so with severe airway obstructive disease and Emphysema. This leads to so-called "Dynamic Hyperinflation" (or Dynamic Overinflation) which places the chest wall and respiratory muscles in a position of mechanical disadvantage and therefore further acutely exacerbates the dyspnea sensation. Deflation of the overinflated chest is therefore critical in such patients.

It has been discovered that patients may be effectively taught to deflate their overinflated lungs with the visual biofeedback training system by showing them how to prolong their expiratory phase past the normal end point of the display by approximately 25% of the programmed expiratory time. Then, when told to breathe in, a reset button is activated that synchronizes the patient inspiration signal with a new prompting waveform. This overinflation corrective breathing pattern may be indicated in the portable prompting device by an override button which prolongs the expiratory phase by 25% while simultaneously giving a continuous visual and/or auditory signal and then resuming the usual prompting signals. The patient continues to press the override button for approximately five to ten breaths, and when again relatively comfortable releases the override button and resumes the normal breathing prompting program.

Hyperventilation Syndrome is a well recognized disease entity wherein so-called "Panic Attacks" lead to excessive breathing, which in turn causes the elimination of excessive and inappropriate amounts of carbon dioxide from the body. Carbon dioxide is a waste product of metabolism and intimately linked to the pH regulation of the body as the dominant volatile acidic component of metabolism. Thus, the excessive loss of this acidic component causes metabolic imbalance to the alkaline side of metabolism, and therefore the production of so-called Respiratory Alkalosis. Respiratory Alkalosis typically causes a wide spectrum of symptoms, including lightheadedness and tingling about the face and hands in mild cases. There may be progressive impairment of cognitive function and later severe disorientation and dizziness or even syncope, which would be a severe danger for subjects in hazardous work or recreational environments. Therefore there is a need for a simple device that can appropriately regulate excessive ventilation under a variety of sometimes hostile field operative conditions, including underwater diving conditions.

SUMMARY OF THE INVENTION

It is therefore one object of the present invention to provide a unique asynchronous timing metronome device specific to the physiologic needs of human subjects as defined by a breathing definition and training method, by controlling respiratory rate and the relative times of inspiration and expiration.

It is another object of the present invention to provide simple visual and/or auditory prompting signals to patients to accurately activate desirable native breathing patterns and learned breathing patterns.

It is yet another object of the present invention to provide breathing control signals to control excessive ventilation, and thereby prevent or reverse Hyperventilation Syndrome adverse consequences.

It is still another object of the present invention to provide breathing control signals to prevent or correct Dynamic Hyperinflation in Asthma and Emphysema.

It is further object of the present invention to provide a portable, battery operated device suitable for operation in the field.

It is still further object of the present invention to optionally provide a device suitable for operating in adverse environments such as underwater diving conditions.

It is a final objective of the present invention to optionally provide a manual override control to prolong the expiratory time by 25% while simultaneously causing the expiratory auditory and visual signals to be continuous, to promote both respiratory rate slowing and deflation of overinflated lungs.

These objectives are achieved by training with a sophisticated visual and auditory biofeedback training device, and in the field by a portable, battery operated device which mimics the learned inspiration and expiration timing. Optionally this is achieved with two types of display. In the simplest form visual prompting is by one Light Emitting Diode (LED) of differing color, one for inspiration and the other for expiration. Optionally the auditory component may be activated, with a simple "beep (high pitched)" or "tick" sound indicating inspiration and a "beep (low pitched)" or "tock" sound indicating expiration. In another preferred embodiment there is one LED to indicate inspiration and another LED to indicate expiration.

Both models of the invention have similar function controls, one to set respiratory rate, and the other to then independently set the time ratio between inspiration and expiration. In the normal subject this Inspiration:Expiration Ratio is typically 1:1.4, and in Emphysema patients and others it typically must be set to 1:1.7 or longer, for example 1:2.5. Otherwise the controls are identical with a system on/off switch, sound on/off switch, a sound volume adjustment control, and a manual expiration prolongation override button.

These and other objects and features of the invention will be seen in the following description and in the drawing.

THE DRAWING

DETAILED DESCRIPTION OF THE PREFERRED EMBODIMENT

In the following description, metric units and standard respiratory terminology as defined by the American College of Chest Physicians are employed unless otherwise stated. Particular attention is directed at the prompting of human subjects to more efficient breathing patterns by simple timing signals indicative of inspiration and expiration by means of both visual and auditory means.

The underlying concept of the instant invention is to prompt patients with Asthma, Chronic Obstructive Pulmonary Disease (COPD)/Emphysema, and Hyperventilation Syndrome to more efficient breathing patterns, thereby overriding inefficient or otherwise undesirable breathing patterns. These more efficient breathing patterns may be native breathing patterns, or learned breathing patterns. Likewise the device may prompt normal subjects to more efficient breathing patterns, e.g. athletes, scuba divers and the like.

The instant invention is primarily a portable stand alone device, which optionally may be used within a breathing pattern definition and training system. Preferably the breathing definition and training system is as described in Hilisman's expired U.S. Pat. No. 3,991,304 wherein the specific method of auditory prompting and expiration prolongation comprise new and significant tools to simply and economically convey complex information into the field and home environments. However, the portable prompting device could also be programmed from a plurality of other breathing testing and definition systems, or could be used empirically without prior breathing parameter definition.

In the preferred embodiment the subject sees indicating LED's for inspiration and expiration in a portable, hand-held device, and optionally may hear distinctive brief high and low frequency "beep" sounds at beginning inspiration and expiration, preferably imitating the familiar "tic" and "tock" of a grandfather clock, though continuous inspiration and expiration sounds, or musical sounds, or breathing sounds, could be employed without departing from the inventive concept.

Figure 1:
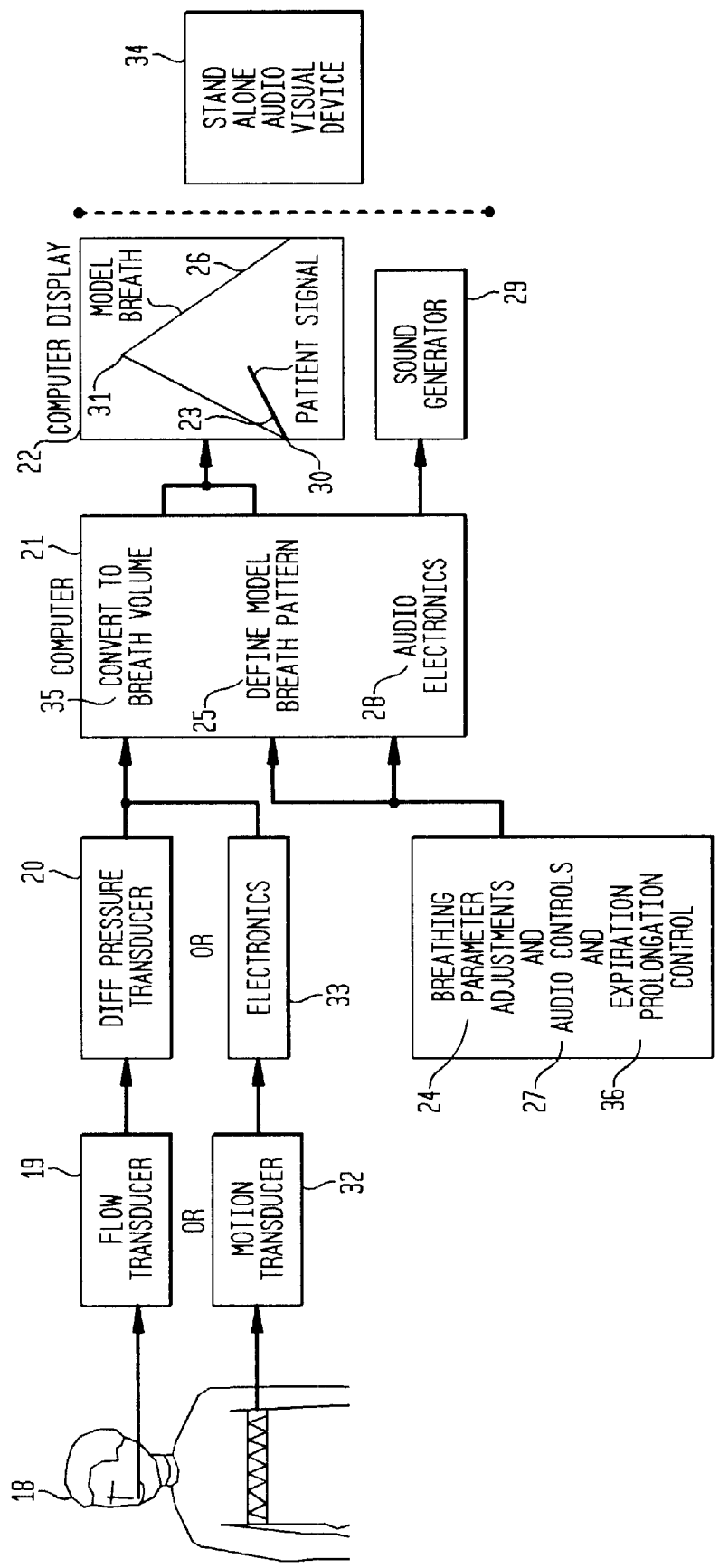
FIG. 1 is a schematic diagram of the breathing definition and training system, as distinct from the stand alone simple audio visual prompting device.

Referring to FIG. 1 which is a schematic of the overall breathing definition and training method (22 and 29) as well as indicating the stand alone simple audio-visual prompting device (34). Patient (18) breathes into Flow Transducer (19) which is sensed by Differential Pressure Transducer (20) the output of which is sent to Computer (21) where this flow signal is converted by Breath Flow to Volume Conversion (35) means. This breath volume signal is output to Computer Display (22) as the Patient Breathing Signal (23). Breathing Parameter Adjustments (24) permit definition of each component part of inspiration and expiration (Tidal Volume, respiratory Rate, Inspiration:Expiration time Ratio, End-inspiration and End-expiration time Pauses, and a variety of inspiration and expiration Waveforms) in accordance with operator derived individual subject physiological needs, thereby generating a desired overall breathing pattern. The Computer (21) uses these parameters to Define the Model Breath Pattern (25) which is output to Computer Display (22) as the Model Breath Pattern (26). Expiration Prolongation Control (36) extends the set expiration time by a selected percent, e.g. 25% while simultaneously causing the expiration sound to signal in a repetative manner. The Patient (18) trains by superimposing their Patient Breathing Signal (23) on the Model Breath Pattern (23). Simultaneously the operator uses Audio Controls (27) which input control parameters to Computer (21) which permit Audio Electronics (28) to permit Computer Sound Generator (29) to produce Inspiration "beep" Signal (30) (high pitched) and Expiration "beep" Signal (31) (low pitched). Therefore, while undergoing complex visual analog breathing pattern training the Patient 18) is simultaneously relating same to the simple auditory Inspiration "beep" Signal (30) (high pitched) and Expiration "beep" Signal (31) (low pitched). Therefore, when the defined respiratory Rate and Inspiration:Expiration time Ratio data is programmed into the Stand Alone Prompting Device (34) the simple visual (flashing LED's) (not shown) and auditory "beeps" (not shown) will prompt the Patient (18) in the desired complex breathing pattern as defined by Model Breath Pattern (26). Alternatively the patient breathing data may be derived from an external chest wall source through Motion Transducer (32) inputting to Intermediary Electronics (33) and then input to Computer (21) and processed as described above with the mouthpiece Flow Transducer (19) to derive Patient Breathing Signal (23).

Figure 2:
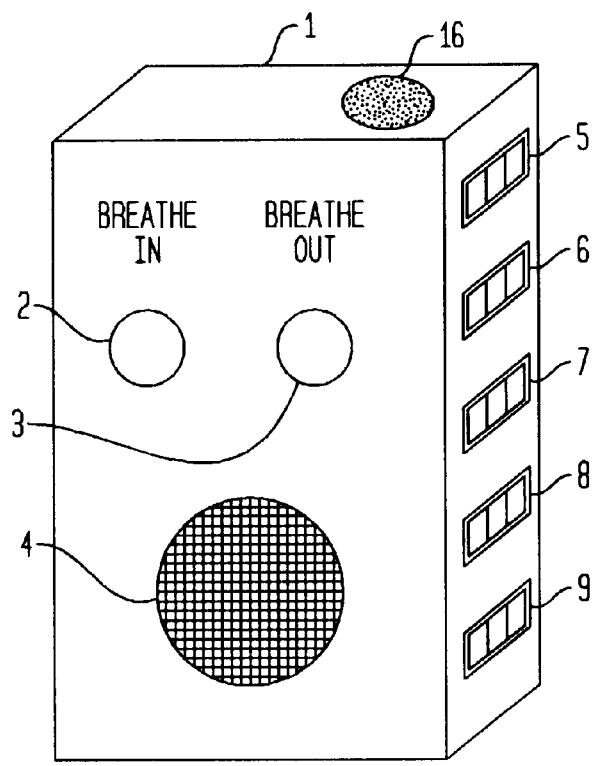
FIG. 2 is a schematic diagram of the two LED version.

Referring to FIG. 2 which is a Two LED Device (1) with prompting devices consisting of an Inspiration LED (2) and Expiration LED (3) and Sound Generator (4). Not shown is Ear Phone Jack (10). The device is controlled by switches along one side (with Ear Phone Jack (10) on the opposite side) consisting of System ON/OFF Switch (5), Respiratory Rate Switch (6), Inspiration:Expiration Time Ratio Switch (7), Sound ON/OFF Switch (8) and Sound Volume Control (9). Respiratory Rate Switch (6) and Inspiration:Expiration Time Ratio Switch (7) are preferably digital so-called Thumbwheel Switches, though other types of switches might be used without departing from the inventive concept. System ON/OFF Switch (5) and Sound ON/OFF Switch (8) are simple switches. Sound Volume Control (9) is a simple analog device, though digital control means might be used without departing from the inventive concept. The Inspiration:Expiration timing control embodied in Inspiration:Expiration Time Ratio Switch (7) could be expressed in different manners, such as Inspiration being a percentage of total cycle time (e.g. 40% Inspiration Time would dictate a 60% Expiration Time) without departing from this inventive concept. Likewise the Respiratory Rate and Inspiration:Expiration timing control could be programmed from a computer device through a data port (not shown) without departing from this inventive concept. On the top is Expiration Prolongation Override Button (16) which must be manually pressed to activate an expiration time override control which prolongs expiration by 25% before reverting to the originally set respiratory cycle time. During this time Expiration LED (3) flashes continuously, and if the sound generation circuit is active then Sound Generator (4) sounds continuously throughout expiration to give a compelling signal indicating an urgent need for respiratory rate slowing or lung deflation. This override signal is the direct prompting equivalent of the expiratory prolongation lung deflation maneuver learned at the visual biofeedback training system. The patient continuously holds the Expiratory Prolongation Override Button (16) for approximately five to ten respiratory cycles of progressive lung deflation, during which time most patients will have sufficient lung deflation to feel substantial dyspnea relief which then permits them to return to their original programmed breathing pattern.

Figure 3:
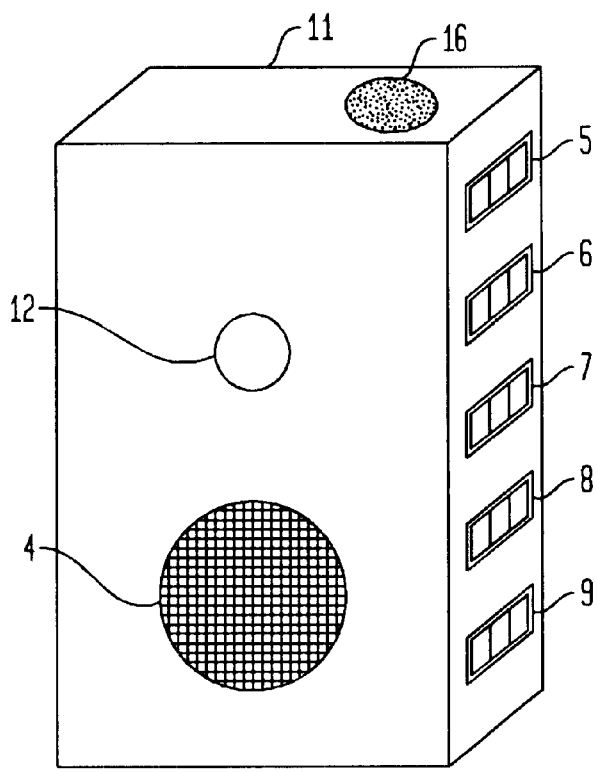
FIG. 3 is a schematic diagram of the alternate single LED version.

Referring to FIG. 3 which is a One LED Device (11) with a Single Two Color LED (12) which changes color on inspiration and expiration, e.g. green on inspiration and red on expiration, though other colors might be used without departing from the inventive concept. The remaining component parts of this device are identical as described under FIG. 1 above. For the remainder of this description only the Two LED Device (1) will be described, and by reference the functionality and purpose of Inspiration LED (2) and Expiration LED (3) will be embodied within the Single Two Colored LED (12) as their functionality and purpose are identical.

Figure 4A:
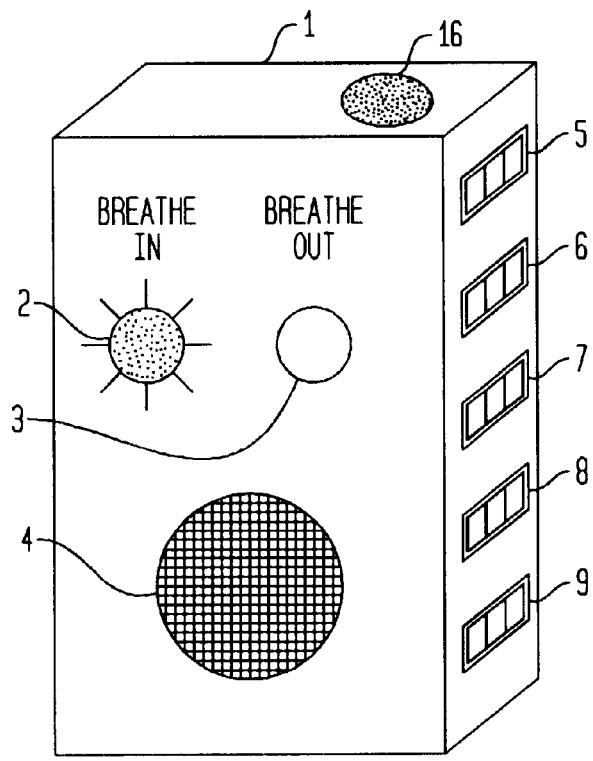
FIG. 4a is a schematic diagram of the two LED version with the inspiration LED activated.

Referring to FIG. 4a, this portable, battery operated Two LED System (1) is activated with System ON/OFF Switch (5). The breathing rate is adjusted by thumbwheel Respiratory Rate Switch (6), and then the relative times of inspiration and expiration are adjusted by thumbwheel switch Inspiration:Expiration Time Ratio Switch (7). Note the precise timing of the expiration signal will of necessity be dependent on the primary respiratory rate set by Respiratory Rate Switch (6). If auditory prompting is desired Sound ON/OFF Switch (8) may be activated, though sound will at all times be sent to Ear Phone Jack (10) (not shown). The sound volume may be adjusted by Sound Volume Control (9). This will result in an inspiration signal by the activation of Inspiration LED (2) and simultaneously a higher pitched inspiration sound "beep" or "tick" is sent to the Sound Generator (4) and Ear Piece Jack (10).

Figure 4B:
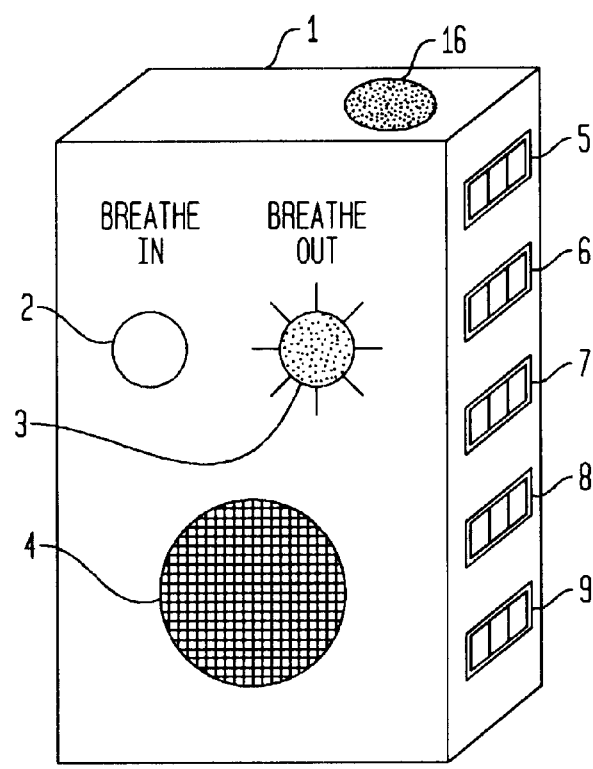
FIG. 4b is a schematic diagram of the two LED version with the expiration LED activated.

Referring to FIG. 4b, this will result in an expiration signal by the activation of Expiration LED (3) and simultaneously a lower pitched expiration "beep" or "tock" sound is sent to the Sound Generator (4) and Ear Piece Jack (10). If the patient desires sound prompting without disturbing others, this may be achieved by using Ear Phones via Ear Phone Jack (10).

Different configurations and packaging of the basic device would be needed for specific applications, and this could be done without departing from the inventive concept. Therefore only a general model of the Stand Alone Prompting Device (34) and Two LED Device (1) is depicted in these drawings.

For example, a scuba diver would require a waterproof configuration, able to withstand high pressures, and preferably miniaturized in a wrist watch-like device. This application would be useful to prevent hyperventilation while at depth, with the resultant wasting of the oxygen supply, and to remind ascending divers of the critically important safety need to not breath hold while returning to the surface. In another embodiment the device could be incorporated into presently available scuba diving monitoring apparatus, without departing from the inventive concept.

Another specific configuration would be the incorporation of the device into clock mechanisms, to subtly provide breathing prompting signals into the general environment, e.g. for victims of Emphysema. The timing signals could be adjusted for various daytime needs, and likewise for subliminal auditory breathing prompting at a lower respiratory rate while sleeping.

Another specific configuration would be for prompting aircraft pilots to control Hyperventilation Syndrome under conditions of stress. This could be incorporated into the aircraft control panel and/or communication earphones, without departing from the inventive concept.

Figure 5:
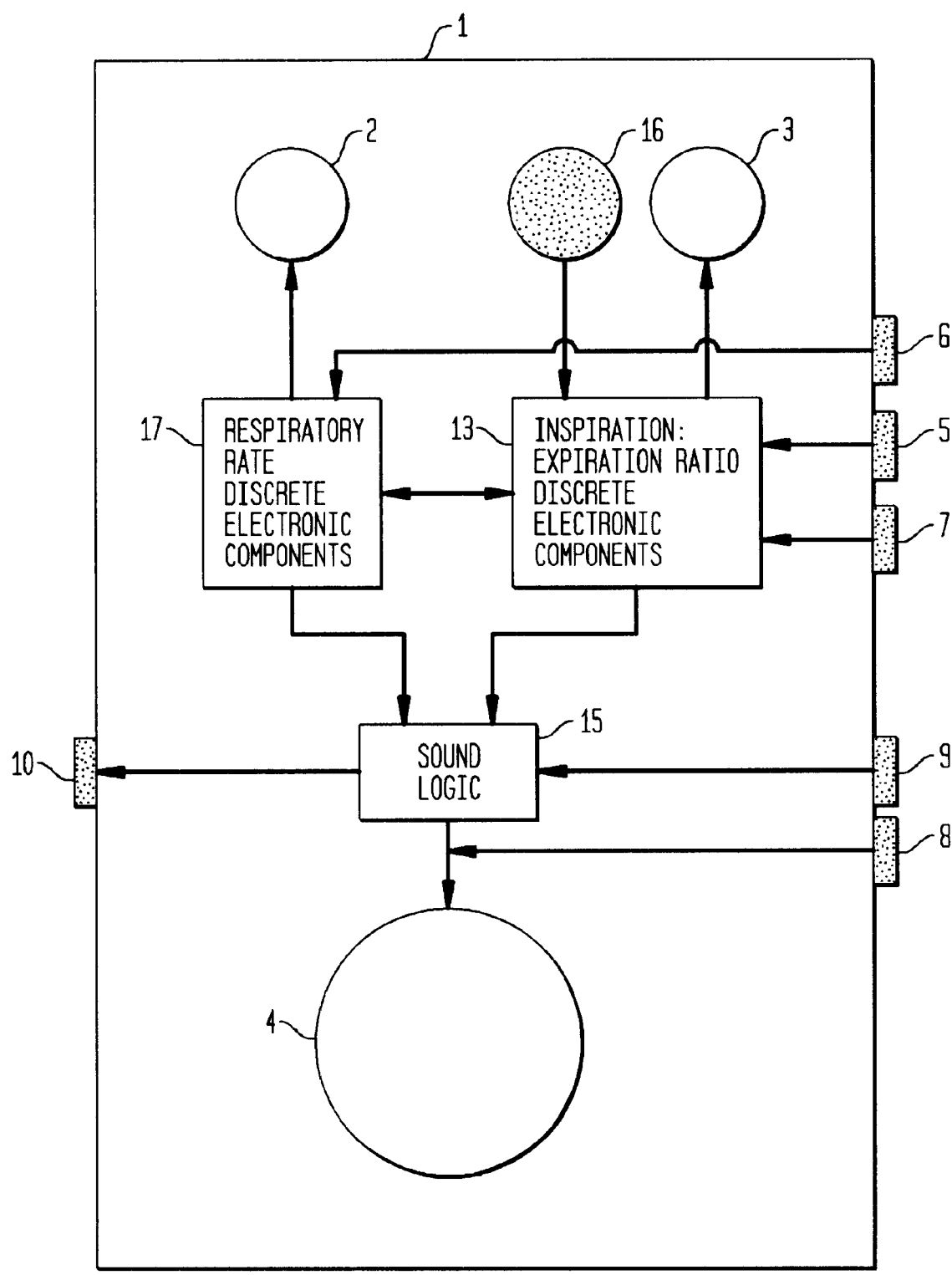
FIG. 5 is a schematic diagram of the functional electronic design using discrete electronic components.

Referring to FIG. 5, this is an electronic schematic block diagram utilizing discrete electronic components. A specific electronic design is not included as the invention could be readily implemented by either digital or analog components, and many different digital and/or analog designs would permit implementation. Furthermore, with the future advent of more efficient and/or economical component parts the original internal design might be changed for commercial reasons, and it is therefore not intended to limit the scope of this invention to an original electronic design that might soon become obsolete for technical and/or commercial reasons.

In the preferred embodiment Two LED Device (1) the electronic implementation is by discrete digital electronic components. System ON/OFF Switch (5) activates the Inspiration:Expiration Digital Circuits (13) which in turn interacts with Respiratory Rate Digital Circuits (17) and Digital Sound Circuits (15) with battery power (not shown). Respiratory Rate Switch (6) inputs breathing frequency logic via thumbwheel switch adjustments to the Respiratory Rate Digital Circuits (17) which in turn activates the Inspiration LED (2). Inspiration:Expiration Time Ratio Switch (7) inputs timing ratio logic to the Inspiration:Expiration Digital Circuits (13), which in turn senses respiratory rate from the Respiratory Rate Digital Circuits (17), and then activates the Expiration LED (3). Simultaneously the Respiratory Rate and Inspiration:Expiration Time data is transmitted to the Digital Sound Circuits (15) providing control to Sound Generator (4). External auditory prompting is achieved by activating the Sound ON/OFF Switch (8), and adjusting the Sound Volume Control (9) appropriately. Sound is always input to the Ear Phone Jack (10), and this is also under control of the Sound Volume Control (9) adjustment. Manual Expiration Prolongation Override Button (16) inhibits the Inspiration:Expiration (13) and Respiratory Rate (17) modules for a time period of 25% of the initially set expiration time, while simultaneously commanding Expiration LED (3) to blink continuously and Sound Logic (15) instructs Sound Generator (4) to "beep" continuously. At the conclusion of this 25% expiratory time pause the system automatically refreshes and initiates the original inspiratory timing prompts through Inspiration LED (2) and Sound Generator (4). Not shown is a block diagram to indicate logic input to a single LED to change colors for inspiration and expiration for the One LED Device (11) shown in FIG. 3.

Figure 6:
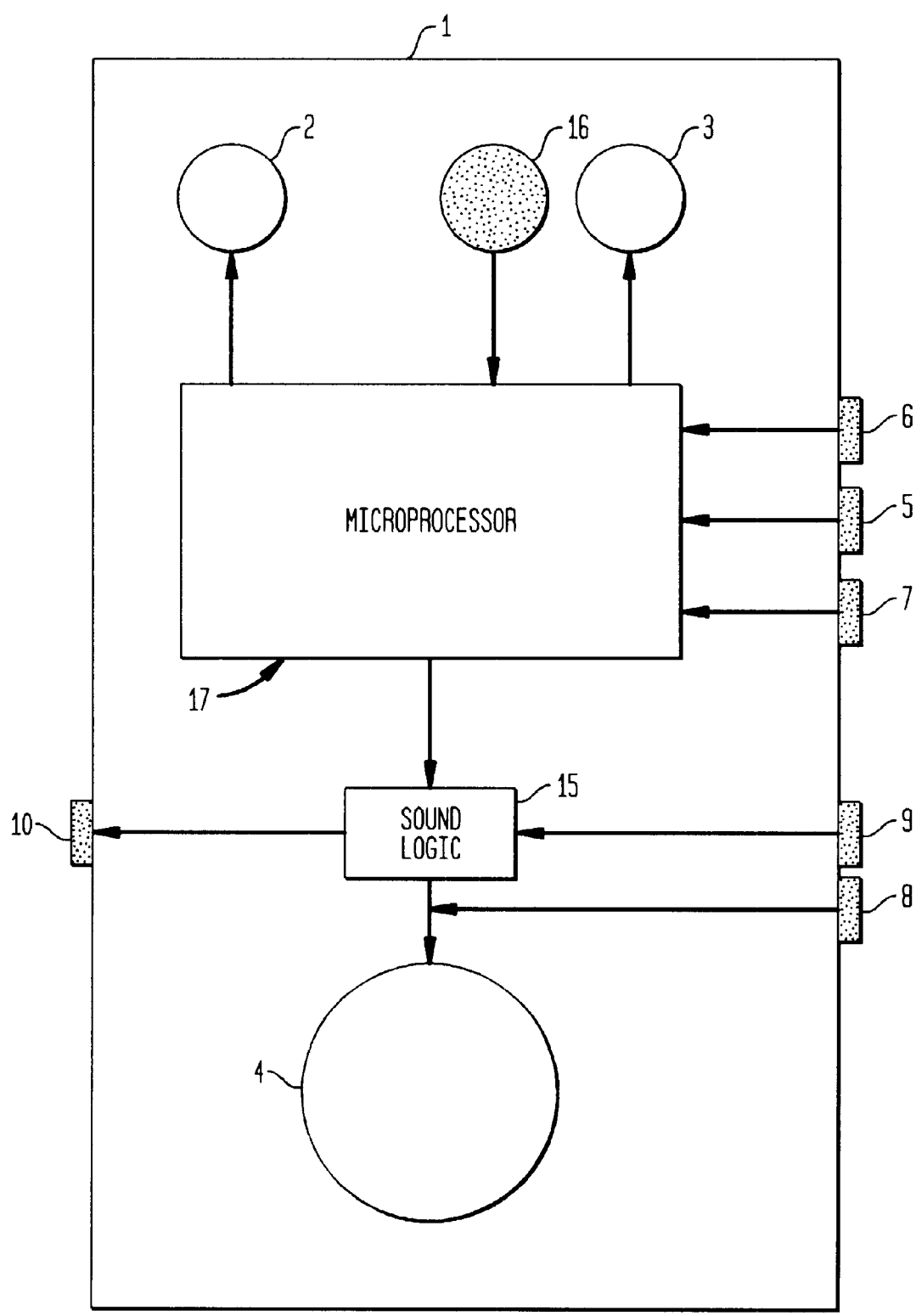
FIG. 6 is a schematic diagram of the functional electronic design using an alternate microprocessor means.

Referring to FIG. 6, this is an electronic schematic block diagram utilizing a basic microprocessor design, as this invention could be readily implemented with same and/or digital signal processor or other digital logic means, and it not intended to limit the scope of this invention to discrete digital and/or analog electronic component designs. The setup logic, and display and sound logic, is as described under FIG. 5, but simply incorporated within the overall microprocessor or digital signal processor design.

In the preferred embodiment Two LED Device (1) the electronic implementation is by Microprocessor (17) control. System ON/OFF Switch (5) activates Microprocessor (17) with battery power (not shown). Respiratory Rate Switch (6) inputs breathing frequency logic via thumbwheel switch adjustments to Microprocessor (17) which in turn activates the Inspiration LED (2). Inspiration:Expiration Time Ratio Switch (7) inputs timing ratio logic to the Microprocessor (17), which in turn senses respiratory rate from internal logic and then activates the Expiration LED (3). Simultaneously the Respiratory Rate and Inspiration-:Expiration Time data is transmitted to the Digital Sound Circuits (15) providing control to Sound Generator (4). External auditory prompting is achieved by activating the Sound ON/OFF Switch (8), and adjusting the Sound Volume Control (9) appropriately. Sound is always input to the Ear Phone Jack (10), and this is also under control of the Sound Volume Control (9) adjustment. Not shown is a block diagram to indicate logic input to a single LED to change colors for inspiration and expiration for the One LED Device (11) shown in FIG. 3. Manual Expiration Prolongation Override Button (16) commands Microprocessor (17) to inhibits the Inspiration:Expiration control and Respiratory Rate control for a time period of 25% of the initially set expiration time, while simultaneously commanding Expiration LED (3) to blink continuously and Sound Logic (15) instructs Sound Generator (4) to "beep" continuously. At the conclusion of this 25% expiratory time pause the system automatically refreshes and initiates the original inspiratory timing prompts through Inspiration LED (2) and Sound Generator (4).

While this invention has been explained by particular examples in the specification and in the drawing, there is no intent to limit the inventive concept except as set forth in the following claims.

What is claimed is:

1. A method for monitoring a respiratory patient to evaluate and train the patient for breathing pattern control, comprising:

measuring the patient's respiration during a series of spontaneous breathing cycles for establishing patient respiration parameters;

establishing a corrective visual patient inspiration and expiration breathing pattern comprising determined tidal volume, respiratory rate, inspiration to expiration time ratio, end inspiration and end expiration breath hold times, and inspiration and expiration waveforms;

training patient respiration performance during a further series of breathing cycles and comparing said performance to the training respiratory pattern;

providing wherein the improvement comprises an auditory prompting signal at the beginning of inspiration and the beginning of expiration;

providing wherein the improvement comprises a manual override control that prolongs the set expiration time by a set percentage.

2. The method in claim 1 wherein the patient visual data is displayed in real time along with the established breathing pattern.

3. The method in claim 1 wherein a patient auditory prompting signal is sounded in real time along with the visual pattern;

optionally the visual pattern may be hidden, to train the patient to reproduce the visual pattern with only the auditory prompting signal.

4. A method in claim 3 wherein the sound and timing of the auditory prompting signal may be duplicated by a simple independent device;

said device also providing a simple flashing signal in conjunction with the auditory prompting signal;

said auditory signal may optionally be silenced.

5. A method in claim 1 wherein the expiratory time may optionally be prolonged a determined percentage time of the determined breathing pattern expiration time in order to promote both a slower overall respiratory rate and lung deflation;

said expiratory time prolongation signaled by an ongoing repetitive expiration sound;

said expiratory sound may be optionally silenced.

6. A method in claim 4 wherein a manual override control prolongs the expiration time by a determined percentage of expiration time identical to the training time of the visual training method of claim 1;

during the selected expiration time the auditory sound signals in a repetitive manner;

during the selected expiration time the flashing signal means signals in a repetitive manner.

7. A method in claim 4 wherein a simple stand alone device may be implemented for a plurality of uses in different environments by repackaging, including;

the basic device generally as shown in (FIGS. 2 and 3) for general subject prompting;

said device repackaged into clock systems for day and night respiratory patient prompting;

said device repackaged into aircraft systems for pilot hyperventilation corrective prompting;

said device repackaged into a waterproof device used in extreme environments and underwater for diver breathing corrective prompting.

8. A method in claim 4 wherein said simple independent device may be configured for a plurality of uses in different environments, including:

said simple independent device configured into an aircraft system for pilot hyperventilation corrective prompting.

9. A method in claim 4 wherein said simple independent device may be configured for a plurality of uses in different environments, including:

said simple independent device configured into a waterproof device used in extreme environments and underwater for diver breathing corrective prompting.

* * * * *